US011174908B2

(12) United States Patent
Mitelman et al.

(10) Patent No.: US 11,174,908 B2
(45) Date of Patent: Nov. 16, 2021

(54) MINIATURE BRAKE AND METHOD OF ASSEMBLY

(71) Applicant: Warner Electric Technology LLC, Braintree, MA (US)

(72) Inventors: Yuriy Mitelman, Southington, CT (US); Patricia M. Mellor, Torrington, CT (US)

(73) Assignee: Warner Electric Technology LLC, Braintree, MA (US)

( * ) Notice: Subject to any disclaimer, the term of this patent is extended or adjusted under 35 U.S.C. 154(b) by 315 days.

(21) Appl. No.: 16/374,892

(22) Filed: Apr. 4, 2019

(65) Prior Publication Data

US 2020/0318700 A1   Oct. 8, 2020

(51) Int. Cl.
*F16D 59/02* (2006.01)
*F16D 65/00* (2006.01)
(Continued)

(52) U.S. Cl.
CPC ......... *F16D 65/0043* (2013.01); *F16D 59/02* (2013.01); *F16D 63/002* (2013.01); *F16D 65/005* (2013.01); *F16D 2121/20* (2013.01)

(58) Field of Classification Search
CPC .. F16D 59/02; F16D 2121/20; F16D 2121/22; F16B 3/005
(Continued)

(56) References Cited

U.S. PATENT DOCUMENTS 2,879,115 A * 3/1959 Pierce .................... F16B 3/005
165/82
4,199,859 A * 4/1980 Swavely ................ F16B 3/005
29/525.03
(Continued)

FOREIGN PATENT DOCUMENTS

DE        10143499 A1 *  3/2003  ............. F16D 55/28
DE   102012019001 A1 *  3/2014  ............. F16D 55/28
(Continued)

OTHER PUBLICATIONS

Machine translation of EP 0680817, retrieved Apr. 10, 2021 (Year: 2021).*
(Continued)

*Primary Examiner* — Bradley T King
(74) *Attorney, Agent, or Firm* — Reising Ethington P.C.

(57) ABSTRACT

A brake and method of assembly are provided. The brake includes a friction plate configured for coupling to a rotatable body for rotation with the rotatable body about an axis of rotation, a pressure plate disposed about the axis on a first side of the friction plate and fixed against rotation, and an armature plate disposed about the axis on a second side of the friction plate. An electromagnet is disposed about the axis on an opposite side of the armature plate relative to the friction plate. A spring biases the armature plate in a first axial direction towards the friction plate and away from the electromagnet to engage the brake. A fastener couples the pressure plate to the electromagnet. The fastener conforms to a space between opposed surfaces of the pressure plate
(Continued)

and the electromagnet and, upon hardening, bonds the pressure plate to the electromagnet.

19 Claims, 2 Drawing Sheets

(51) Int. Cl.
  *F16D 63/00* (2006.01)
  *F16D 121/20* (2012.01)
(58) Field of Classification Search
  USPC .......................................... 403/269; 188/171
  See application file for complete search history.

(56) References Cited

U.S. PATENT DOCUMENTS

| | | | | | |
|---|---|---|---|---|---|
| 4,910,423 | A | * | 3/1990 | Werber | H02K 7/1028 |
| | | | | | 188/171 |
| 6,459,182 | B1 | * | 10/2002 | Pfann | H02K 7/1025 |
| | | | | | 188/161 |
| 7,641,026 | B1 | * | 1/2010 | Hayward | F16D 65/12 |
| | | | | | 188/161 |
| 8,092,312 | B2 | * | 1/2012 | Duncan | F16D 1/116 |
| | | | | | 464/134 |
| 2005/0271481 | A1 | * | 12/2005 | Zins | E21D 15/44 |
| | | | | | 405/288 |
| 2007/0107998 | A1 | * | 5/2007 | Vogt | F16D 67/00 |
| | | | | | 188/163 |
| 2011/0019953 | A1 | * | 1/2011 | Nuissl | F16C 41/001 |
| | | | | | 384/572 |
| 2018/0001878 | A1 | | 1/2018 | Thomas | |
| 2018/0135713 | A1 | | 5/2018 | Nyquist et al. | |

FOREIGN PATENT DOCUMENTS

| | | | | |
|---|---|---|---|---|
| EP | 0680817 | A1 * | 11/1995 | ........... B29C 66/112 |
| EP | 0 905 402 | A2 | 3/1999 | |
| GB | 2383099 | A * | 6/2003 | .......... F16L 55/1116 |
| KR | 10-0868878 | B1 | 11/2008 | |
| WO | 2019/007932 | A1 | 1/2019 | |

OTHER PUBLICATIONS

Machine translation of DE 10 2012 019 001, retrieved Apr. 10, 2021 (Year: 2021).*
International Search Report issued in corresponding International (PCT) Patent Application No. PCT/US2020/026117 (dated Oct. 29, 2020).
Written Opinion issued in corresponding International (PCT) Patent Application No. PCT/US2020/026117 (dated Oct. 29, 2020).

* cited by examiner

MINIATURE BRAKE AND METHOD OF ASSEMBLY

BACKGROUND OF THE INVENTION a. Field of the Invention

This disclosure relates to an electromagnetic brake. In particular, the instant disclosure relates to an electromagnetic brake in which components are joined without the use of conventional fasteners to facilitate manufacture of a relatively small brake that is capable of generating a relatively high level of braking torque.

b. Background Art

In conventional electromagnetic brakes, brake components are coupled together using threaded fasteners, bolts, pins, swaging and/or press fits. Certain applications, however, require brakes that are relatively small and conventional fasteners often limit how small the brake can be made. In particular, conventional fasteners generally must remain large enough to enable easy handling and assembly of the brake. Further, the space in the brake required by conventional fasteners limits the potential size of the electromagnetic components of the brake and, therefore, the brake torque that can be generated.

The inventors herein has recognized a need for a brake that will minimize and/or eliminate one or more of the above-identified deficiencies.

BRIEF SUMMARY OF THE INVENTION

A brake and a method of assembling a brake are described herein. The brake is assembled without the use of conventional fasteners to facilitate manufacture of a relatively small brake that is capable of generating a relatively high level of braking torque.

A brake in accordance with one embodiment of the invention includes a friction plate configured for coupling to a rotatable body for rotation with the rotatable body about an axis of rotation. The brake further includes a pressure plate disposed about the axis on a first side of the friction plate and fixed against rotation and an armature plate disposed about the axis on a second side of the friction plate. The brake further includes an electromagnet disposed about the axis on an opposite side of the armature plate relative to the friction plate. The brake further includes a spring biasing the armature plate in a first axial direction towards the friction plate and away from the electromagnet to engage the brake. The brake further includes a fastener coupling the pressure plate to the electromagnet. The fastener conforms to a space between opposed surfaces of the pressure plate and the electromagnet and, upon hardening, bonds the pressure plate to the electromagnet.

A method of assembling brake in accordance with one embodiment of the invention includes the step of arranging a friction plate, a pressure plate, an armature plate and a first member of an electromagnet such that the friction plate is disposed about an axis of rotation, the pressure plate and armature plate are disposed about the axis on opposites sides of the friction plate, the first member of the electromagnet is disposed about the axis on an opposite side of the armature plate from the friction plate, and the pressure plate is aligned with the first member of the electromagnet to define a space between opposed surfaces of the pressure plate and the first member of the electromagnet. The method further includes the step of coupling the pressure plate to the first member of the electromagnet with a fastener. The fastener conforms to the space between the opposed surfaces of the pressure plate and the first member of the electromagnet and, upon hardening, bonds the pressure plate to the first member of the electromagnet. The method further includes the steps of inserting a spring into the first member of the electromagnet and coupling a second member of the electromagnet supporting a conductor to the first member of the electromagnet such that the conductor is disposed radially between the first and second members of the electromagnet and the spring extends through the first member of the electromagnet and is seated between the armature plate and the second member of the electromagnet.

A brake and method of assembling a brake in accordance with the present teachings are advantageous relative to conventional brakes and methods of assembly. In particular, the brake described herein is made without the use of conventional fasteners. As a result, the brake can be made relatively small while retaining sufficient size for electromagnetic components of the brake in order to generate a relatively high level of torque. The elimination of conventional fasteners also enables more efficient assembly of the brake and prevents contamination of friction surfaces in the brake with thread locking adhesives that are often used with conventional fasteners. The brake described herein also enables a precise air gap between the armature plate and electromagnet to be established during assembly by removing the impact of a tolerance stackup of the brake components.

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 3:
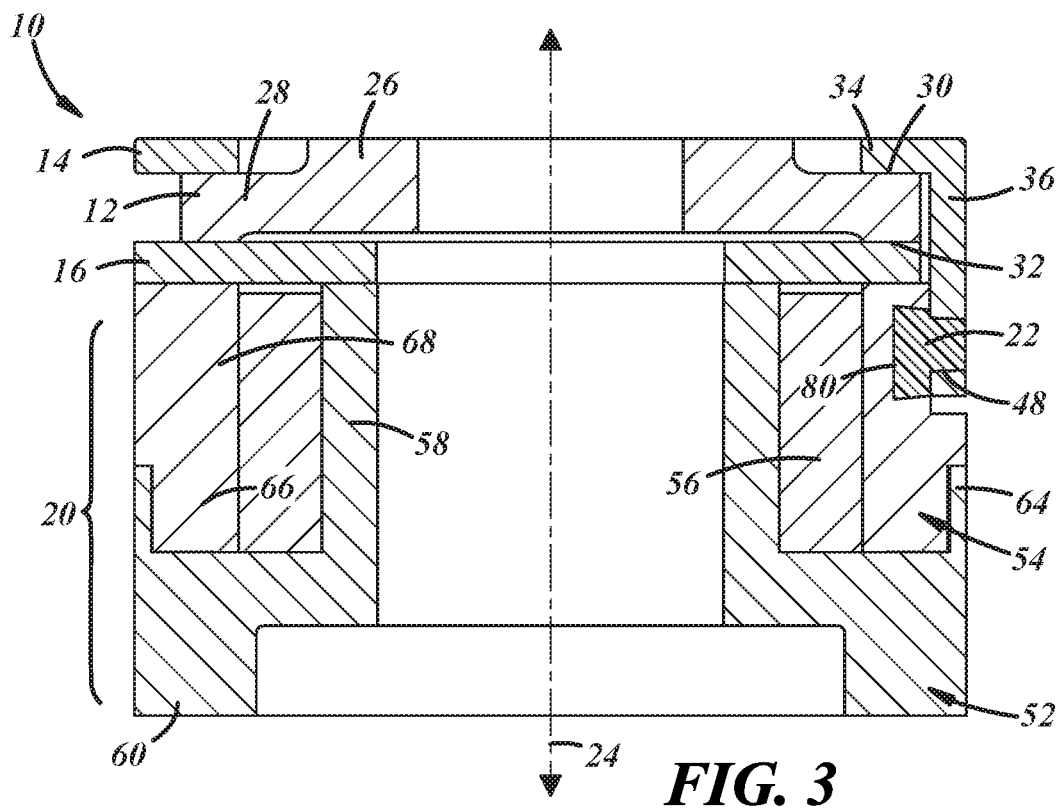
FIGS. 3-4 are cross-sectional views of the brake of FIGS. 1-2.

Referring now to the drawings wherein like reference numerals are used to identify identical components in the various views, FIG. 1-4 illustrate a brake 10 in accordance with one embodiment of the invention. Brake 10 provides a braking torque to a rotatable body such as a shaft, gear, pulley, blade, etc. in order to slow or halt rotation of a rotating body or to prevent rotation of a stationary body (i.e., a parking brake). It will be understood by those of ordinary skill in the art that brake 10 may be used in a wide variety of industrial and other applications requiring a brake. Brake 10 may include a friction plate 12, a pressure plate 14, an armature plate 16, means, such as springs 18, for biasing armature plate 16 in one direction, and means, such as electromagnet 20, for urging armature plate 16 in another direction. Referring to FIG. 3, in accordance with one aspect of the present teachings, brake 10 may also include one or more fasteners 22 used to couple the pressure plate 14 and electromagnet 20 together.

Figure 4:
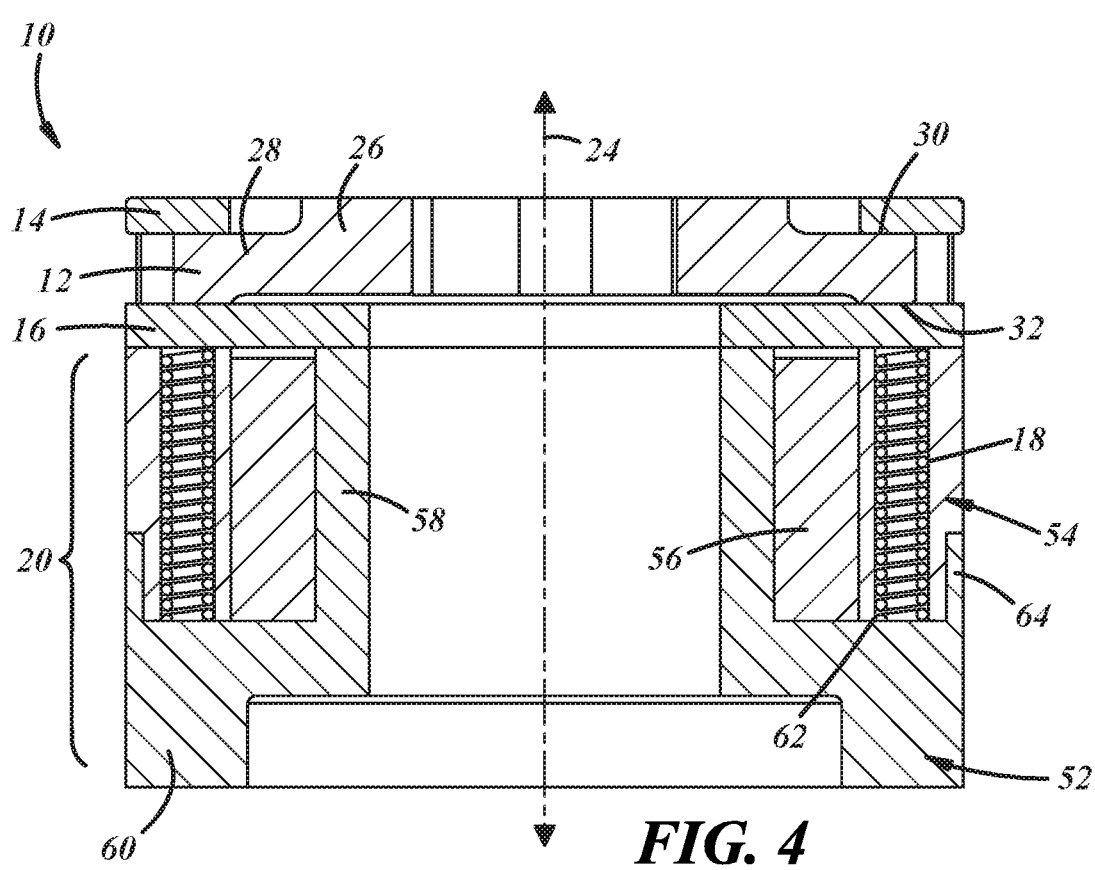

Friction plate 12 is provided to transmit a braking torque to a shaft or other rotating body. Friction plate 12 may be made from conventional metals or plastics and may be made by stamping, molding and/or machining. Friction plate 12 may be annular in shape and disposed about, and centered about, a rotational axis 24. Referring to FIGS. 3-4, in the illustrated embodiment the outer diameter of friction plate 12 varies along the axial length of friction plate 12 such that a smaller diameter portion 26 is disposed within, and radially aligned with, a portion of pressure plate 14 while a larger diameter portion 28 is disposed axially between pressure plate 14 and armature plate 16. Friction plate 12 is coupled to, and configured for rotation with, a shaft (not shown) or other rotating body about axis 24. Friction plate 12 may be rotationally coupled to the shaft in a variety of ways that permit axial movement of friction plate 12 relative to the shaft to enable proper operation of brake 10 and account for wear, vibration, runout or thermal expansion. For example, the radially inner surface of friction plate 12 and the radially outer surface of the shaft may have complementary, torque transmitting, shapes such as splines, a key and keyway, single or double D-shape or hexagonal shape. Friction plate 12 includes friction surfaces on opposed sides 30, 32 configured to engage pressure plate 14 and armature plate 16, respectively, during engagement of brake 10.

Figure 5:
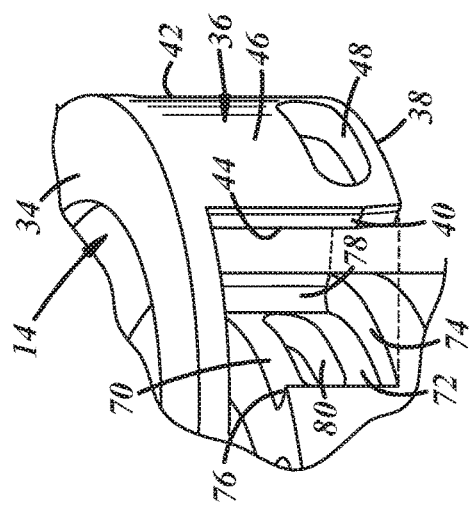
FIG. 5 is an enlarged exploded view illustrating the relationship between certain components of the brake of FIGS. 1-2.
Figure 2:
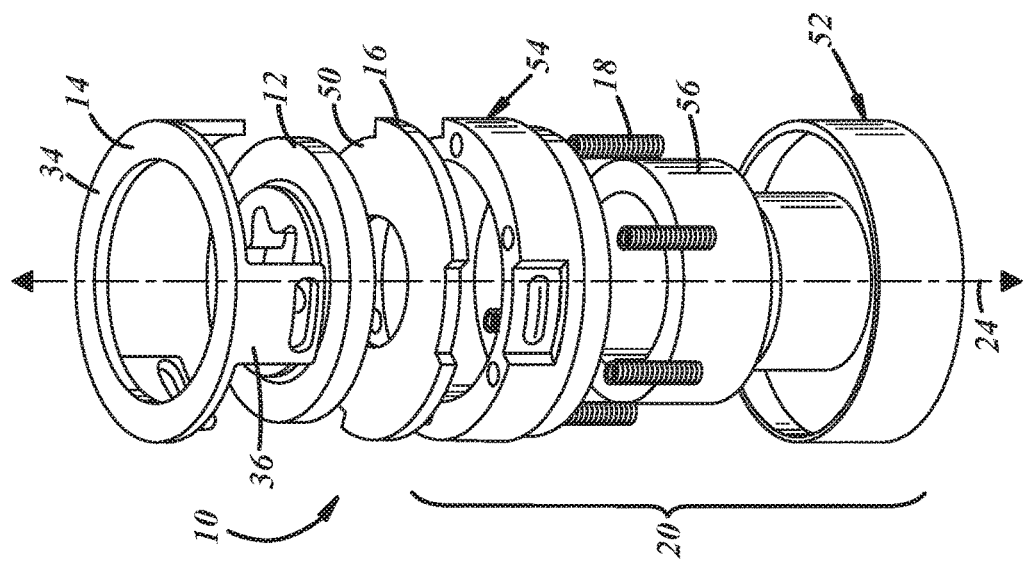
FIGS. 1-2 are exploded perspective views of a brake in accordance with one embodiment of the present invention.

Referring again to FIGS. 1-2, pressure plate 14 is configured to engage friction plate 12 during application of brake 10 to transmit a braking torque to friction plate 12. Pressure plate 14 provides a reaction surface against which armature plate 16 presses friction plate 12 during application of brake 10. In accordance with one aspect of the present teachings, pressure plate 14 also establishes the relative positions and orientations of components of brake 10 and inhibits relative rotation of those components about axis 24. Pressure plate 14 may be made from conventional metals, plastics or composites. Pressure plate 14 includes an annular body 34 and a plurality of arms 36 extending from body 34. Body 34 and arms 36 may together form a unitary (one-piece) structure which may be fixed against rotation by coupling pressure plate 14 to a rotationally fixed structure such as electromagnet 20. Referring to FIG. 3, body 34 is disposed on side 30 of friction plate 12 and may be disposed about, and centered about, axis 24. Body 34 provides a reaction surface configured to engage friction plate 12 during application of brake 10. Referring again to FIGS. 1-2, arms 36 position and orient pressure plate 14 relative to the other components of brake 10 and prevent relative movement between the components. The combination of body 34 and arms 36 enables a single component to function as a reaction surface, establish the axial and circumferential positions of the components of brake 10 and prevent relative rotation of components in brake 10 thereby simplifying the design and assembly of brake 10. Arms 36 extend axially from body 34 and, in particular, from a radially outer portion of body 34 such that body 34 and arms 36 establish a constant outer diameter of pressure plate 14. In the illustrated embodiment, pressure plate 14 includes three arms 36. It should be understood, however, that the number of arms 36 may vary. In the illustrated embodiments, arms 36 are equally, circumferentially spaced about axis 24. It should be understood, however, that the spacing between arms 36 may vary. Each arm 36 is substantially rectangular in shape when viewed in a radial direction. Referring to FIG. 5, each arm 36 defines a plurality of walls 38, 40, 42 extending between radially inner and outer surfaces 44, 46 of arm 36. Wall 38 extends in a generally circumferential direction and is disposed at one axial end of arm 36 distant from body 34. Walls 40, 42 extend in a generally axial direction between body 34 and wall 38. In the illustrated embodiment, each arm 36 further defines an aperture 48 that extends radially through arm 32 between surfaces 44, 46 of arm 36 for a purpose described hereinbelow.

Referring again to FIGS. 1-2, armature plate 16 is configured to engage friction plate 12 during application of brake 10 to transmit a braking torque to friction plate 12. Armature plate 16 may be made from metals or metal alloys or other materials having relatively low magnetic reluctance such as iron or steel. Referring to FIG. 3, armature plate 16 is disposed on side 32 of friction plate 12. Armature plate 16 is annular in shape and may be disposed about, and centered about, axis 24. Armature plate 16 is axially movable towards and away from friction plate 12 and pressure plate 14 to permit engagement and disengagement of brake 10. Referring again to FIGS. 1-2, armature plate 16 is fixed against rotation about axis 24. In particular, armature plate 16 defines a plurality of slots 50 in a radially outer perimeter configured to receive arms 36 of pressure plate 14. Upon assembly, arms 36 of pressure plate 14 extend through slots 50 in armature plate 16 such that walls 40, 42 of each arm 36 are circumferentially aligned with corresponding walls in armature plate 16 forming a corresponding slot 50 thereby inhibiting relative rotation of pressure plate 14 and armature plate 16.

Springs 18 provide a means for biasing armature plate 16 in one direction along axis 24 towards friction plate 12 and pressure plate 14 and away from electromagnet 20 to engage brake 10. Springs 18 are seated between armature plate 16 and a surface of electromagnet 20 and exert a biasing force on armature plate 16 urging friction plate 12 towards pressure plate 14. Springs 18 are disposed in an annular array about axis 24 and may be equally circumferentially spaced about axis 24.

Electromagnet 20 provides a means for urging armature plate 16 in the opposite direction along axis 24 away from friction plate 12 and pressure plate 14 to disengage brake 10. Electromagnet 20 also provides structural support and orients other components of brake 10 including pressure plate 14 and springs 18. Electromagnet 20 is disposed on a side of armature plate 16 opposite friction plate 12 and includes inner and outer members 52, 54 and a conductor 56 which may comprise a conventional wound coil or similar conductor. Energizing the conductor creates an electromagnetic circuit among armature plate 16, members 52, 54 and conductor 56 that urges armature plate 16 towards electromagnet 20 and away from friction plate 12 against the biasing force of springs 18 to disengage brake 10. Members 52, 54 may be made from metals or metal alloys or other materials having relatively low magnetic reluctance such as iron or steel.

Referring to FIGS. 3-4, inner member 52 supports conductor 56 and provides a seat for springs 18 in addition to functioning as part of the electromagnetic circuit. Inner member 52 is generally annular in shape and may be disposed about, and centered about, axis 24. Inner member 52 has an outer diameter that varies along the axial length of member 52. A smaller diameter portion 58 of member 52 is disposed proximate one axial end of member 52 proximate armature plate 16 and is sized to support conductor 56 and outer member 54 thereon. A larger diameter portion 60 of member 52 is disposed proximate the opposite axial end of member 52 distant from armature plate 16. Referring to FIG. 4, portion 60 defines a radially extending surface 62 that functions as a spring seat for each spring 18. An annular, axially extending flange 64 extends from a radially outer surface of portion 60 in the direction of armature plate 16 and is configured to engage outer member 54 in a press fit relationship.

Figure 1:
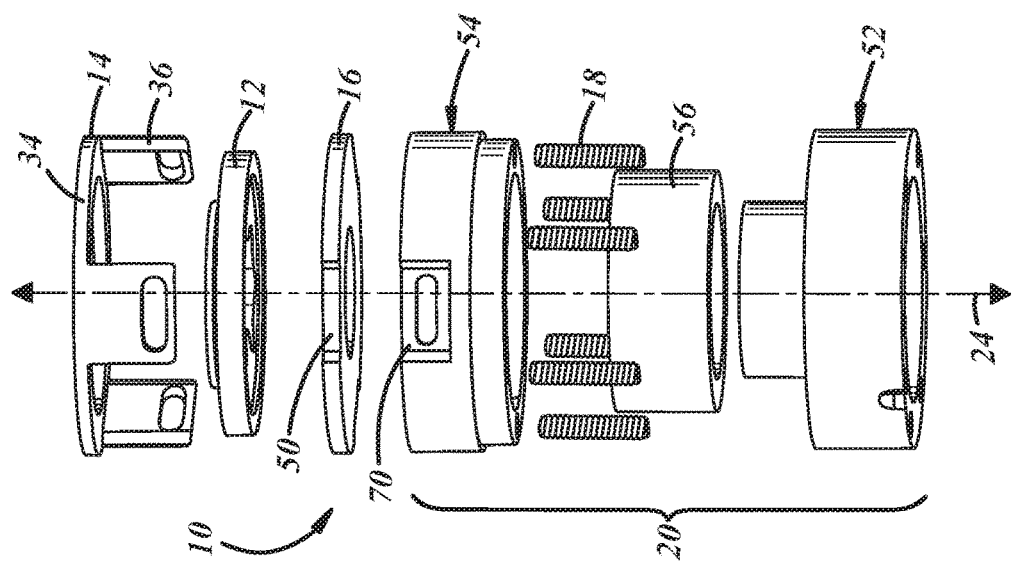

Outer member 54 provides a means for coupling electromagnet 20 to pressure plate 14 in addition to functioning as part of the electromagnetic circuit. Outer member 54 is annular in shape and may be disposed about, and centered about, axis 24. Outer member 54 defines a plurality of bores extending from one axial end of member 54 to an opposite end of member 54 and configured to receive springs 18 such that springs 18 are located radially outwardly of conductor 56. Referring to FIG. 3, outer member 54 has an outer diameter that varies along the axial length of member 54. A small diameter portion 66 of member 54 is disposed proximate one axial end of member 54 distant from armature plate 16 and is configured to engage flange 64 of member 52 in a press fit relationship. A larger diameter portion 68 of member 54 is disposed proximate the axial end of member 54 near armature plate 16 and has an outer diameter equal to the outer diameter of portion of 60 of member 52. Portions 66, 68 define a shoulder therebetween configured to engage flange 64 to position members 52, 54 relative to one another. Referring to FIG. 1, portion 68 of member 54 defines a plurality of recesses 70 in a radially outer surface that are axially aligned with slots 50 in armature plate 16 and are configured to receive arms 36 of pressure plate 14. The shapes of arms 36 and recesses 70 are complementary. In particular, each recess 70 is substantially rectangular in shape when viewed in a radial direction. Referring to FIG. 5, each recess 70 is defined by a floor 72 configured to engage radially inner surface 44 of arm 36 and a plurality of walls 74, 76, 78 extending radially from the floor 72 to a radially outermost surface of member 54. Wall 74 extends in a generally circumferential direction and is disposed at one axial end of recess 70. Walls 76, 78 extend in a generally axial direction between wall 74 and one axial end of member 54. Walls 74, 76, 78 are configured to engage walls 38, 40, 42, respectively, of arm 36 upon assembly. Walls 40, 42 of arms 36 and walls 76, 78 in member 54 inhibit relative rotation of pressure plate 14 and electromagnet 20 upon assembly. In the illustrated embodiment, member 54 further defines a well 80 formed in the floor 72 of each recess 70. Well 80 is configured for radial alignment with aperture 48 in arm 36 upon assembly of brake 10. Referring to FIG. 3, at least one of an axial dimension of well 80 and a circumferential dimension of well 80 is greater than a corresponding axial or circumferential dimension of aperture 48 for a purpose described below.

Fasteners 22 are provided to couple pressure plate 14 to electromagnet 20. In accordance with one embodiment, fasteners 22 are made from polymers and, in particular, thermosetting polymers including plastics, polyesters, epoxies, polyimides, polyurethanes, silicones or melamine resins that flow freely into a space between opposed surfaces of the pressure plate 14 and electromagnet 20, conform to the space and, upon hardening, bond pressure plate 14 to electromagnet 20. In accordance with another embodiment fasteners 22 comprise welds formed from resistance welding (and, in particular, spot welding) in which heat is generated at the interfaces between arms 36 and electromagnet 20 by passing electric current through pressure plate 14 and electromagnet 20 under pressure in order to join faying surfaces of the arms 36 and electromagnet 20. The welds likewise conform to the space between opposed surfaces of the pressure plate and the electromagnet and, upon hardening, bond the pressure plate 14 to the electromagnet 20. In this embodiment, apertures 48 in arms 36 and wells 80 in member 54 of electromagnet 20 may be eliminated. By using these fasteners (i.e., polymer materials and/or welds) to couple pressure plate 14 and electromagnet 20, brake 10 can be formed without the use of conventional fasteners such as screws, bolts, pins, etc. During assembly of the embodiment of brake 10 employing polymer fasteners, arms 36 of pressure plate 14 are inserted into recesses 70 in member 54 of electromagnet 20 such that the aperture 48 in each arm 36 is radially aligned with a corresponding well 80 in member 54. The polymer material is extruded through aperture 48 and into well 80 and conforms to the shape of aperture 48 and well 80 and the space between pressure plate 14 and electromagnet 20. Referring to FIG. 3, because at least one of the axial and circumferential dimensions of well 80 is greater than the corresponding axial and circumferential dimensions of aperture 48, the material fills the space between a radially inner surface of pressure plate 14 (in particular, surface 44 of arm 36 (see FIG. 5) and a radially outer surface of electromagnet 20 (in particular, floor 72 of recess 70 of member 54 (see FIG. 5)) and bonds to the radially inner surface of pressure plate 14 and the radially outer surface of electromagnet 20.

Referring again to FIGS. 1-2, brake 10 may be assembled in accordance with the following method. The method may begin with the step of arranging friction plate 12, pressure plate 14, armature plate 16 and member 54 of electromagnet 20 such that friction plate 12 is disposed about axis 24, pressure plate 14 and armature plate 16 are disposed about axis 24 on opposites sides of friction plate 12, member 54 of electromagnet 20 is disposed about axis 24 on an opposite side of armature plate 16 relative to friction plate 12, and pressure plate 14 is aligned with member 54 of electromagnet 20 to define a space between opposed surfaces in pressure plate 14 and member 54 of electromagnet 20. This step may include the substep of moving pressure plate 14 and/or armature plate 16 and inserting arms 36 of pressure plate 14 through slots 50 in armature plate 16. This step may further include the substep of moving pressure plate 14 and/or member 54 of electromagnet 20 and inserting arms 36 of pressure plate 14 into recesses 70 in member 54. In the embodiment in which polymer fasteners are used, arms 36 preferably extend far enough into recesses 70 to radially align apertures 48 in arms 36 with corresponding wells 80 in member 54. The method may continue with the step of establishing a predetermined distance between armature plate 16 and the member 54 of electromagnet 20. This step may include the substep of inserting a shim having a known thickness between armature plate 16 and member 54 of electromagnet 20. In this manner, the air gap between armature plate 16 and member 54 is set to a predetermined distance as opposed being dependent on the tolerance stackup during assembly. The method may continue with the step of coupling pressure plate 16 to member 54 of electromagnet 20 with one of more fasteners 22. This step may include the substep of inserting a material, such as a thermosetting polymer, into the aperture 48 in each arm 36 of pressure plate 14 and into the corresponding well 80 in each recess 70 in member 54. The material will conform to the spaces between opposed surfaces in pressure plate 14 and member 54 (e.g., between the radially inner surface 44 of arm 36 and floor 72 of recess 70 of member 54 (see FIG. 5)) and, upon hardening, bond pressure plate 14 to member 54. Alternatively, this step may include the substeps of applying pressure to the interfaces between arms 36 of pressure plate 14 and electromagnet 20 and generating heat at the interface (i.e., resistance welding) to create fasteners in the form of welds between the opposed surfaces of the arms 36 and electromagnet 20. The welds will likewise conform to the spaces between the opposed surfaces in pressure plate 14 and member 54 of electromagnet 20 (e.g., between the radially inner surface 44 of arm 36 and floor 72 of recess 70 of member 54 (see FIG. 5)) and, upon hardening, bond pressure plate 14 to member 54. The method may continue with the step of inserting springs 18 into member 54 of electromagnet 20. The method may then continue with the step of coupling member 52 of electromagnet 24 supporting conductor 56 to member 54 of electromagnet 20. Once coupled, conductor 56 will be disposed radially between members 52, 54 and springs 18 will be seated between armature plate 16 and member 52 of electromagnet 20 (in particular, surface 62 of member 52).

A brake 10 and method of assembling a brake in accordance with the present teachings are advantageous relative to conventional brakes and methods of assembly. In particular, the brake 10 described herein is made without the use of conventional fasteners. As a result, the brake 10 can be made relatively small while retaining sufficient size for electromagnetic components of the brake 10 in order to generate a relatively high level of torque. The elimination of conventional fasteners also enables more efficient assembly of the brake 10 and prevents contamination of friction surfaces in the brake 10 with thread locking adhesives that are often used with conventional fasteners. The brake 10 described herein also enables a precise air gap between the armature plate 16 and electromagnet 20 to be established during assembly by removing the impact of a tolerance stackup of the brake components.

While the invention has been shown and described with reference to one or more particular embodiments thereof, it will be understood by those of skill in the art that various changes and modifications can be made without departing from the spirit and scope of the invention.

What is claimed is:

1. A brake, comprising:
    a friction plate configured for coupling to a rotatable body for rotation with the rotatable body about an axis of rotation;
    a pressure plate disposed about the axis on a first side of the friction plate and fixed against rotation;
    an armature plate disposed about the axis on a second side of the friction plate;
    an electromagnet disposed about the axis on an opposite side of the armature plate relative to the friction plate;
    a spring biasing the armature plate in a first axial direction towards the friction plate and away from the electromagnet to engage the brake; and,
    a first fastener coupling the pressure plate to the electromagnet
    wherein the first fastener conforms to a first space between opposed surfaces of the pressure plate and the electromagnet and, upon hardening, bonds the pressure plate to the electromagnet
    wherein the electromagnet defines a first recess and the pressure plate includes a first arm extending axially into the first recess, the first arm defining first and second circumferentially spaced walls and the first recess defined by first and second circumferentially spaced walls configured to engage corresponding ones of the first and second circumferentially spaced walls of the first arm to inhibit relative rotation of the pressure plate and the electromagnet about the axis.
2. The brake of claim 1 wherein the first recess is formed in a radially outer surface of the electromagnet.
3. The brake of claim 1 wherein the armature plate includes a first slot axially aligned with the first recess in the electromagnet and through which the first arm of the pressure plate extends, the first arm and the slot configured to inhibit relative rotation of the pressure plate and the armature plate about the axis.
4. The brake of claim 1 wherein the first arm includes an aperture extending radially therethrough and radially aligned with a well in the electromagnet, the first fastener disposed within the aperture and the well.
5. The brake of claim 4 wherein at least one of an axial dimension of the well and a circumferential dimension of the well is greater than a corresponding axial dimension of the aperture and a corresponding circumferential dimension of the aperture.
6. The brake of claim 1 wherein the electromagnet defines a second recess circumferentially spaced from the first recess and the pressure plate includes a second arm circumferentially spaced from the first arm and extending axially into the second recess, the second arm and the second recess configured to inhibit relative rotation of the pressure plate and the electromagnet about the axis.
7. A brake, comprising:
    a friction plate configured for coupling to a rotatable body for rotation with the rotatable body about an axis of rotation;
    a pressure plate disposed about the axis on a first side of the friction plate and fixed against rotation;
    an armature plate disposed about the axis on a second side of the friction plate;
    an electromagnet disposed about the axis on an opposite side of the armature plate relative to the friction plate;
    a spring biasing the armature plate in a first axial direction towards the friction plate and away from the electromagnet to engage the brake; and,
    a first fastener coupling the pressure plate to the electromagnet
    wherein the first fastener conforms to a first space between opposed surfaces of the pressure plate and the electromagnet and, upon hardening, bonds the pressure plate to the electromagnet
    wherein the electromagnet includes first and second members and a conductor disposed radially between the first and second members, the first member disposed radially outwardly of the conductor and defining a bore extending axially therethrough and configured to receive the spring, the spring seated between the second member of the electromagnet and the armature plate.
8. The brake of claim 7, further comprising a second fastener coupling the pressure plate to the electromagnet wherein the second fastener conforms to a second space between the opposed surfaces of the pressure plate and the electromagnet and, upon hardening, bonds the pressure plate to the electromagnet.
9. The brake of claim 8 wherein the opposed surfaces of the pressure plate and the electromagnet are radially aligned and comprise a radially inner surface of the pressure plate and a radially outer surface of the electromagnet.
10. A method of assembling a brake, comprising the steps of:
    arranging a friction plate, a pressure plate, an armature plate and a first member of an electromagnet such that the friction plate is disposed about an axis of rotation, the pressure plate and armature plate are disposed about the axis on opposites sides of the friction plate, the first member of the electromagnet is disposed about the axis on an opposite side of the armature plate from the friction plate, and the pressure plate is aligned with the first member of the electromagnet to define a first space between opposed surfaces of the pressure plate and the first member of the electromagnet;

coupling the pressure plate to the first member of the electromagnet with a first fastener, the first fastener conforming to the first space between the opposed surfaces of the pressure plate and the first member of the electromagnet and, upon hardening, bonding the pressure plate to the first member of the electromagnet;

inserting a spring into the first member of the electromagnet; and, coupling a second member of the electromagnet supporting a conductor to the first member of the electromagnet such that the conductor is disposed radially between the first and second members of the electromagnet and the spring extends through the first member of the electromagnet and is seated between the armature plate and the second member of the electromagnet.

11. The method of claim 10, further comprising the step of establishing a predetermined distance between the armature plate and the first member of the electromagnet before coupling the pressure plate to the first member of the electromagnet with the first fastener.

12. The method of claim 10 wherein the arranging step includes the substep of inserting a first arm of the pressure plate into a first recess in the first member of the electromagnet such that relative rotation of the pressure plate and the first member of the electromagnet about the axis is inhibited.

13. The method of claim 12 wherein the first recess is formed in a radially outer surface of the first member of the electromagnet.

14. The method of claim 12 wherein the arranging step further includes the substep of inserting the first arm through a slot in the armature plate axially aligned with the first recess in the first member of the electromagnet, the first arm and the slot configured to inhibit relative rotation of the pressure plate and the armature plate about the axis.

15. The method of claim 12 wherein the arranging step includes the sub step of radially aligning an aperture extending radially through the first arm with a well in the first member of the electromagnet and wherein the step of coupling the pressure plate to the first member of the electromagnet includes inserting the first fastener into the aperture and the well.

16. The method of claim 15 wherein at least one of an axial dimension of the well and a circumferential dimension of the well is greater than a corresponding axial dimension of the aperture and a corresponding circumferential dimension of the aperture.

17. The method of claim 12 wherein the arranging step includes the substep of inserting a second arm of the pressure plate, circumferentially spaced from the first arm of the pressure plate, into a second recess in the first member of the electromagnet, the second recess circumferentially spaced from the first recess, the second arm and the second recess configured to inhibit relative rotation of the pressure plate and the first member of the electromagnet about the axis.

18. The method of claim 10, further comprising the step of coupling the pressure plate to the first member of the electromagnet with a second fastener, the second fastener conforming to a second space between the opposed surfaces of the pressure plate and the first member of the electromagnet and, upon hardening, bonding the pressure plate to the first member of the electromagnet.

19. The method of claim 10 wherein the opposed surfaces of the pressure plate and the first member of the electromagnet are radially aligned and comprise a radially inner surface of the pressure plate and a radially outer surface of the first member of the electromagnet.

\* \* \* \* \*